Dec. 8, 1942.                    A. SAVA                    2,304,318
LOCK DEVICE FOR ANTISKID CHAINS
Filed Sept. 8, 1941
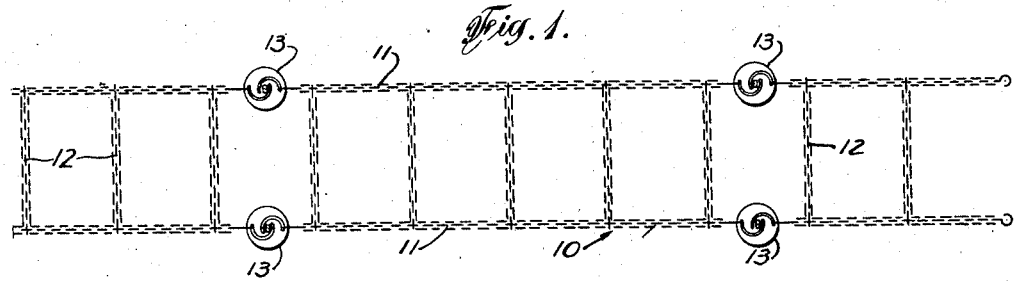
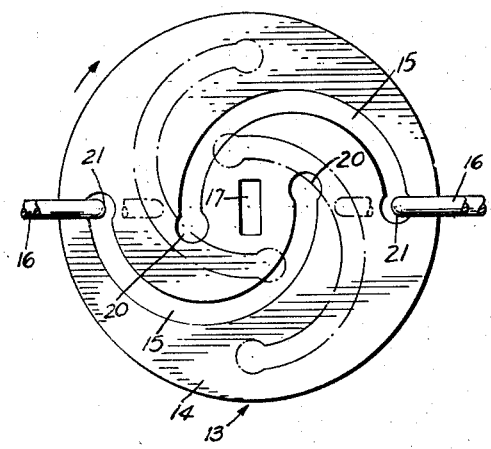
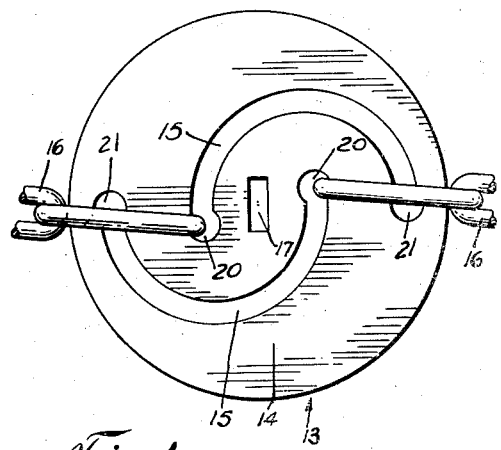
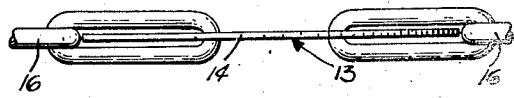
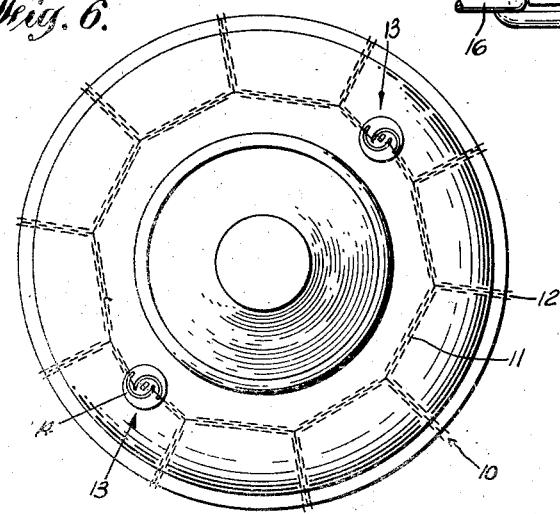
INVENTOR
Amabil Sava Patented Dec. 8, 1942

2,304,318

UNITED STATES PATENT OFFICE 2,304,318

LOCK DEVICE FOR ANTISKID CHAINS

Amabil Sava, Brooklyn, N. Y.

Application September 8, 1941, Serial No. 410,011

2 Claims. (Cl. 152—242)

This invention relates to Antiskid chains, and more particularly to a lock device which is adapted to tighten the chain on a vehicle tire. A device which regulates the tension of the chain, so to obtain the right adherence.

An object of this invention is to provide a chain tightener having slots therethrough for receiving the end links of one of the side chains of an automobile tire chain and the like, and which can be manipulated to increase the tension in the tire chain.

Another object of this invention is to provide means for drawing the ends of a chain tightly together and to automatically lock the ends of the chain in the tight position.

Another object of this invention is to provide a plate having two substantially semi-circular through slots facing in opposite directions and the centers of the slots spaced apart on opposite sides of the center of the plate, whereby a cam action may be had for chain links moving in said slots.

Another object of this invention is to provide a chain tightening device which is not only simple in construction but which locks more securely and does away with the use of a plurality of radially positioned springs which tend to pull the chain together along radial lines.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a plan view of a tire chain in extended position and showing a plurality of chain tighteners of my invention applied thereto.

Figure 2 is a side elevation on an enlarged scale of an assembled chain tightener in open or extended position.

Figure 3 is a side elevation on an enlarged scale of the chain tightener shown in Figure 2, in position just before the links assume their linear direction in service position.

Figure 4 is an end view on an enlarged scale of the chain tightener shown in Figure 3.

Figure 5 is a perspective view of a key for turning the chain tightener from open to closed position, or vice versa.

Figure 6 is a side elevation of a tire having a plurality of chain tighteners applied thereto.

In the illustrated embodiment of the invention, the numeral 10 indicates an antiskid tire chain comprising two side chains 11 and cross chains 12 connected in unitary relation.

A plurality of chain tighteners 13 made in accordance with this invention are shown integrally connected to each side chain 11. As best shown on an enlarged scale in Figures 2, 3 and 4, each chain tightener 13 comprises a plate 14, preferably of disk-shaped form and having slots 15, 15 therethrough.

The slots 15 are of substantially semi-circular form and are somewhat longer than a semi-circle. The centers of the slots are spaced apart and are positioned on opposite sides of the center of the plate. The slots face in opposite directions.

Chain links 16, forming part of one of the side chains 11 extend through the slots 15 and face in opposite directions. The chain links in the said assembled position, cause the plate 14 to function as a link in one of the side chains.

The plate 14 has an aperture 17 which is preferably of rectangular form and serves to receive the rectangular end 18 of a handle 19 by means of which the plate 14 may be turned.

When the plate 14 is turned in the direction shown by the arrow in Figure 2, there is a cam action upon each link, and when the links are caused to travel along the slots they are forced toward the central portion of the plate and assume a position closer together.

The turning movement of the plate in direction of the arrow imparts positive movements to the end links, this movement being due to the eccentricity of the curved slots with relation to the center of the plate.

As best shown in Figures 2 and 3, each slot 15 has an enlarged end portion 20 at the central portion of the plate. The enlargements 20 serve to receive and lock the chain links in fixed position in the slots, when the links have been moved to the central portion of the plate by manipulation of the handle 19. The slots may also have end enlargements 21. In accordance with the patent statutes I have described and illustrated the preferred embodiment of my invention, but it will be understood that various changes and modifications can be made therein without departing from the spirit of the invention as defined by the appended claims.

I claim:

1. A chain tightener comprising a disk-shaped plate provided with two substantially semi-circular slots, two chain links extending through said slots, the centers of said slots being spaced apart and said slots being positioned to face in opposite directions, each of said slots having an enlarged end portion at least at the central portion of said disk, said enlargements being positioned on opposite sides of a line passing between said centers, whereby when said plate is rotated in one direction, said links are brought closer together and when rotated in the opposite direction said links are spaced further apart, and means for rotating said plate.

2. In combination, a chain tightener comprising a plate provided with two substantially semi-circular slots, two chain links extending through said slots and facing in opposite directions, the centers of said slots being spaced apart and said slots being positioned to face in opposite directions, each of said slots having an enlarged end portion at the central portion of said plate, whereby said plate may be turned in one direction to bring said links close together and in the opposite direction to bring said links further apart, a rectangular aperture in the central portion of said plate, and a handle having means for engagement with said aperture for turning said plate.

AMABIL SAVA.